E. M. KRAMER.

SKELETON HARROW DISK.

APPLICATION FILED JULY 3, 1909.

Reissued Feb. 23, 1915. 13,885.

Witnesses
C. M. Jones Jr.
C. M. Walker.

Inventor
Emil M. Kramer,
By H. P. Dodge
Attorney

UNITED STATES PATENT OFFICE.

EMIL M. KRAMER, OF PAXTON, ILLINOIS.

SKELETON HARROW-DISK.

13,885. Specification of Reissued Letters Patent. Reissued Feb. 23, 1915.

Original No. 907,509, dated December 22,1908, Serial No. 443,882. Application for reissue filed July 3, 1909. Serial No. 506,259.

*To all whom it may concern:*

Be it known that I, EMIL M. KRAMER, a citizen of the United States, residing at Paxton, in the county of Ford and State of Illinois, have invented a new and useful Skeleton Harrow-Disk, of which the following is a specification.

This invention relates to skeleton harrow disks and it consists in the novel construction and arrangement of its parts as hereinafter shown and described.

The object of the invention is to provide a skeleton or open disk, which is especially adapted to be used for harrowing the soil at the time when it is turned by the plow, and with this object in view the device consists of a hub, to which is attached a series of arms. The said hub is channeled or recessed for the reception of the inner ends of the arms and the inner ends of the said arms abut against each other, as will hereinafter be described. The outer portions of the arms are formed into blades of peculiar configuration and the said arms are slightly curved or concaved longitudinally. The blades are provided with cutting edges, all of which occupy curves of which every point is equidistant perpendicularly from the axis of the hub, or stated otherwise, all the curves lie in the same lateral surface of an imaginary cylinder whose axis is the axis of the hub, whereby the blade edges form in outline a disk edge interrupted solely by the space between the ends of the adjoining blades. The blade is formed with a heel and toe portion, the heel portion being that which is adapted to first enter the ground and is followed by the toe portion, which is the last part to emerge from the ground. The heel portions of all of the blades occupy a common plane, while the toe portions of all the blades occupy a common plane which is different from that occupied by the heel portions of the blades. The configuration of the blades is such that as the heel portions emerge from the ground they slightly spade or turn the soil, while the cutting edges of the blades cleave the soil. All of the toe portions of the blades are disposed in the same circular directions, and as the toe portion of one blade is spaced from the heel portion of a next adjacent blade and this arrangement is preserved throughout the entire series, the disk is a skeleton or open harrow and cannot accumulate the soil, which may be of a sticky nature, as the soil which would adhere to the blade is eventually pushed off through the open spaces between the blades and the arms.

Figure 1:
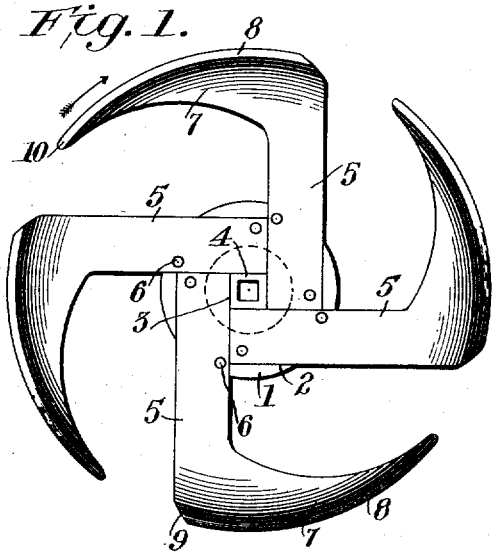
Figure 2:
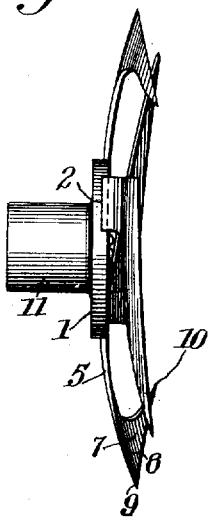
Figure 3:
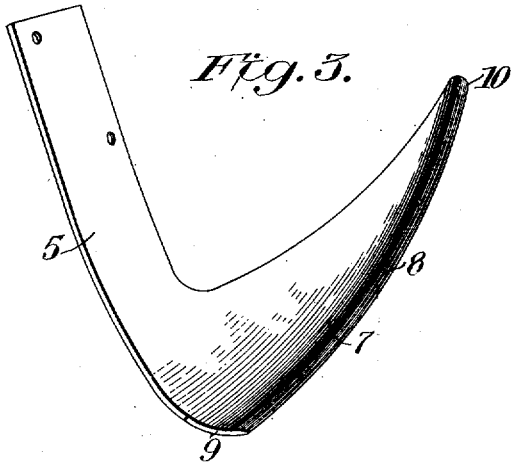

In the accompanying drawing, Fig. 1 is a side elevation of the skeleton disk; Fig. 2 is an edge elevation of the same, and Fig. 3 is a perspective view of one of the arms and blade of the disk detached from the hub.

The disk consists of the hub plate 1, which is provided with a series of rectangularly disposed channels 2. The said hub is provided with a square or angled central perforation, which is surrounded by a square or angled boss 4. The limbs 5 of the arms constitute shanks and snugly fit at their inner ends in the recesses 2, and the inner ends of limbs 5 abut against the side edge of the next adjacent arm. This arrangement is preserved or continued throughout the entire series of limbs. The limbs 5 are slightly concaved as shown in Figs. 2 and 3 of the drawing. The longitudinal edges of the limbs, however, are parallel so that the arms extend for substantially their entire length in lines which lie in planes parallel to planes passing through the radii of the hub.

The limbs 5 are held in the recesses 2 by means of the rivets 6 which are passed through the inner portions of the said arms and the hub 1. The outer portions of the limbs 5 merge into limbs 7 constituting blade portions which in turn are provided with curved cutting edges 8. The cutting edges 8 of all of the blade portions 7 describe curves, lying in the surface of a cylinder whose axis is that of the disk, as illustrated in Fig. 1 of the drawing. Each blade portion 7 is provided at its forward end with a heel portion 9 and at its rear end with a toe portion 10. The heel portions 9 of all of the blade portions 7 lie in the same plane as shown in Fig. 2 of the drawing, while the toe portions 10 of all of the blade portions 7 lie in the same plane which is different from that plane in which the heel portions 9 lie. Consequently the said blade portions 7 are slightly curved or twisted laterally as is clearly illustrated in Fig. 2 of the drawing.

In operation a series or gang of the skeleton disks as above described, are mounted upon a shaft or rod by passing the said shaft or rod through the square or non-circular perforations in the hubs of the said disks, and the sleeves or spools 11 as shown in Fig. 2 of the drawing, are interposed between the hubs 1 of the disks for the purpose of holding the said disks at proper spaces from each other. When the series of gangs of disks as described, are so mounted upon the shafts or axle and as the disks are rolled upon their edges over the surface of the ground they rotate in the direction as indicated by the arrow in Fig. 1 of the drawing, consequently, the heel portions 9 of the blade portions 7 first enter the ground, then the cutting edges 8 of the blade portions 7 penetrate into the ground, until the toe portions 10 enter into the soil. When this occurs, the heel portions emerge from the soil and in doing so the soil is slightly spaded or turned, owing to the peculiar lateral disposition or relative position existing between the heel portions 9 and the toe portion 10 of the blade portions 7. It will thus be seen that the soil is treated with a shearing cut and at the same time is slightly spaded or turned and that by reason of the fact that the toe portions 10 are acuminate or pointed, they will not have a tendency to accumulate the soil, but will gently draw out the soil as they move in an upward direction. It will also be observed that by reason of the fact that the disks are of skeleton or open formation, that any material which may accumulate thereon will eventually push toward the center and in the course of time will be forced from the blade portions 7 between the inner edges of the said portions and the edges of the next adjacent limbs 5. Thus it will be seen that the disks will, in a great measure, keep themselves free from accumulations, and at the same time they will treat the soil effectually and will render the same in proper condition for planting or other purposes.

Having thus described my invention, what I claim as new is:—

1. A blade disk harrow member having a hub provided with a central rectangular boss and arms rectangularly disposed on said hub with edges abutting against the boss, and the adjacent arms having their edges at right angles to each other, the shanks of said arms extending in planes parallel to planes passing through radii of the hub, but out of alinement with said radii and having blade or cutting portions at the ends of the shanks, extending in elongated curves which lie in the surface of a cylinder whose axis is that of the hub, and providing a broken, rim-like disk edge.

2. In combination with a supporting hub, a blade disk harrow member having an inner shank limb with edges extending substantially parallel to the radii of the hub and having an outer blade limb, the edges of which are curved and the outer edge of which constitutes a cutting edge and extends in an elongated curve lying throughout its length in the lateral surface of the cylinder the axis of which is the hub, said blade limb being concaved on one side.

3. In combination with a supporting hub, a blade disk harrow member having arcuate blade limbs each provided with an outer cutting edge, a forward heel portion and a toe portion, the toe portion being bent laterally outwardly and carrying the toe beyond the plane of the heel, the said edge extending in a continuous curve lying in the lateral surface of a cylinder whose axis is the axis of the hub on which the member is mounted, said member adapted to operably rotate with the heel portion entering the soil first, and having supporting shanks each extending outwardly from the hub with its edges parallel and integrally joining the limb at the heel thereof only.

4. In combination with a supporting hub, a blade disk member mounted on said hub and having separated shank limbs and having blade limbs, the cutting edges of which extend in curves of greater length than the width of the shank limbs and which edges lie in the lateral surface of a cylinder whose axis is the axis of said hub, said blade limbs having heel portions adjacent the junction of said limbs with the shanks and having toe portions at the rear extremities thereof and said blade limbs tapering in width from said heel portions to said toe portions.

5. In combination with a supporting hub, a blade disk member mounted on said hub and having straight shank limbs and having blade portions formed with outer cutting edges which extend in curves elongated beyond the width of the shanks and lying in the lateral surface of a cylinder whose axis is coincident with the axis of the hub on which the member is mounted, the said blade portions having front heel parts and rear toe parts and being bent laterally outward, so as to carry the rear toe portion beyond the plane of the forward heel portion, the said blade portions tapering in width from heel to toe.

6. A soil pulverizing blade disk member mounted on a hub and having shanks or arms spaced apart and extending in planes parallel to planes passing through radii of the hub and continued into curved pulverizing blade portions joined at their heel portions only to the said shanks or arms, said blade portions being projected rearwardly in the line of rotation of said member beyond said shanks or arms, and having their outer edges extending in curves lying in the same lateral surface of a cylinder whose axis is the hub.

7. In a disk as described, an arm curved laterally along its longer dimension, and merging at its outer end into a blade portion, which is disposed with its longer dimension at an angle to the longer dimension of the arm portion, said blade portion being laterally curved along its longer dimension and having an arcuate cutting edge, the blade portion gradually decreasing in breadth toward that end remote from the arm portion, the sides of the blade portion being inclined in the same general direction as that of the lateral curvature of the arm portion.

In testimony whereof, I have affixed my signature in the presence of two witnesses.

EMIL M. KRAMER.

Witnesses:

MAYME A. STUBBERT,

J. W. KAUFMANN.

Copies of this patent may be obtained for five cents each, by addressing the "Commissioner of Patents, Washington, D. C."